United States Patent [19]
Berke

[11] Patent Number: 5,929,965
[45] Date of Patent: Jul. 27, 1999

[54] HEADWEAR WITH OPTICAL ELEMENTS FOR EXTENDING THE FIELD OF VISION

[76] Inventor: Joseph J. Berke, 2063 Long Lake Shore, West Bloomfield, Mich. 48323

[21] Appl. No.: 09/088,299

[22] Filed: Jun. 1, 1998

Related U.S. Application Data

[62] Division of application No. 08/694,643, Aug. 9, 1996, Pat. No. 5,764,335.

[51] Int. Cl.⁶ ........................................................ G02C 7/14
[52] U.S. Cl. .................................................. 351/50; 206/8
[58] Field of Search ................................. 351/50, 41, 158

[56] References Cited

U.S. PATENT DOCUMENTS

| | | | |
|---|---|---|---|
| 4,896,956 | 1/1990 | Berke et al. | 351/50 |
| 5,416,536 | 5/1995 | Tee, Jr. | 351/50 |
| 5,764,335 | 6/1998 | Berke | 351/50 |

*Primary Examiner*—Hung Xuan Dang
*Attorney, Agent, or Firm*—Alex Rhodes

[57] ABSTRACT

An article of headwear for hunters, security guards, motorcyclists, industrial workers, spectators, joggers, hikers and boy and girl watchers. The headwear reduces accidents and crime and is comprised of a pair of reflectors mounted on the frame at about the eye level of a user, a pair of elongated slender arms having inner end portions mounted for rotation on a front portion of the headwear and a pair of reflectors joined by spherical joints to outer end portions of the slender arms. The slender arms are independently rotatable from non-operative positions adjacent to the front of the frame to operative positions forward of the frame. When the arms are at the forward operative positions, the reflectors are selectively rotatable about the spherical joints to extend the user's field of vision in lateral, vertical and rearward directions. When the headwear is not in use, the arms are stored adjacent to the front of the headwear and the reflectors are stored adjacent to sides of the headwear.

18 Claims, 7 Drawing Sheets

HEADWEAR WITH OPTICAL ELEMENTS FOR EXTENDING THE FIELD OF VISION

This application is a division of Ser. No. 08/694,643 filed Aug. 9, 1996 now U.S. Pat. No. 5,764,335.

FIELD OF THE INVENTION

This invention relates to devices for extending the normal field of vision and more particularly to headwear with reflective elements for extending the normal field of vision in lateral, vertical and rearward directions.

BACKGROUND OF THE INVENTION

Vision has been fundamental to the quality of human existence throughout history. Vision affects safety as well as the enjoyment of life. The normal field of vision is restricted by human anatomy and physiology, mainly, the restricted movement of the eyes and the flexibility of the neck. Many devices have been proposed for extending the normal field of vision, however, none are known to have gained public acceptance. It is believed that the failures of these devices to gain public acceptance is due to limited utility and unconventional appearance.

The public is generally conservative regarding their personal appearance and unless articles provide substantial utility will reject articles which cause them to be conspicuous. Moreover, the public will surely reject articles if their appearance is unattractive. In view of the benefits of extending the normal field of vision, headwear of worthwhile utility would be welcomed by such diverse groups as hunters, hikers, bird watchers, sport spectators, aviators, motorists, boy and girl watchers, joggers, industrial workers, pedestrians, police and servicemen. Moreover, it would provide an opportunity for deterring crime and reducing injuries. If such a system would be adopted, shoplifters, rapists and other law breakers would lose the advantage of the restricted normal field of vision.

SUMMARY OF THE INVENTION

The present invention is an article of headwear for extending the normal field of vision. One benefit of the headwear is that the field of vision can be extended in lateral, vertical and rearward directions. Another benefit is that the appearance of the headwear is complementary with current styling themes.

One characteristic feature of the invention is that a pair of reflectors are mounted on outer ends of long slender elongated arms which are attached to a front portion of the headwear. A second characteristic feature is that the arms are oriented in end-to-end relationship on the frame. A third characteristic feature is that the arms rotate in horizontal planes. A fourth characteristic feature is that the reflectors are attached to the ends of the arms with spherical joints. A fifth characteristic feature is that the arms are stored adjacent to the front of the headwear and the reflectors are stored adjacent to sides of the headwear when the reflectors are not in use. A sixth characteristic feature is that the reflectors are adjustable both fore-and-aft and about the three coordinate axes. When the arms are at their operative positions, the reflectors enable a user to view objects at the sides, above, below, and behind the user.

In a first aspect of the invention, the reflectors are permanently mounted on a conventional article of headware such as a baseball cap serves as a frame for mounting the slender arms. In a second aspect, the reflectors are detachably mounted on a conventional article of headwear, such as a baseball cap or helmet.

The invention will be better understood and further objects, characterizing features, details and advantages thereof will appear more clearly with reference to the ensuing detailed descriptions of a preferred embodiment taken in connection with the accompanying diagrammatic drawings illustrating the invention by way of non-limiting example only. At the end of the detailed description, numbered claims are set forth in which exclusive property are claimed.

DETAILED DESCRIPTION OF THE PREFERRED EMBODIMENT

Figure 1:
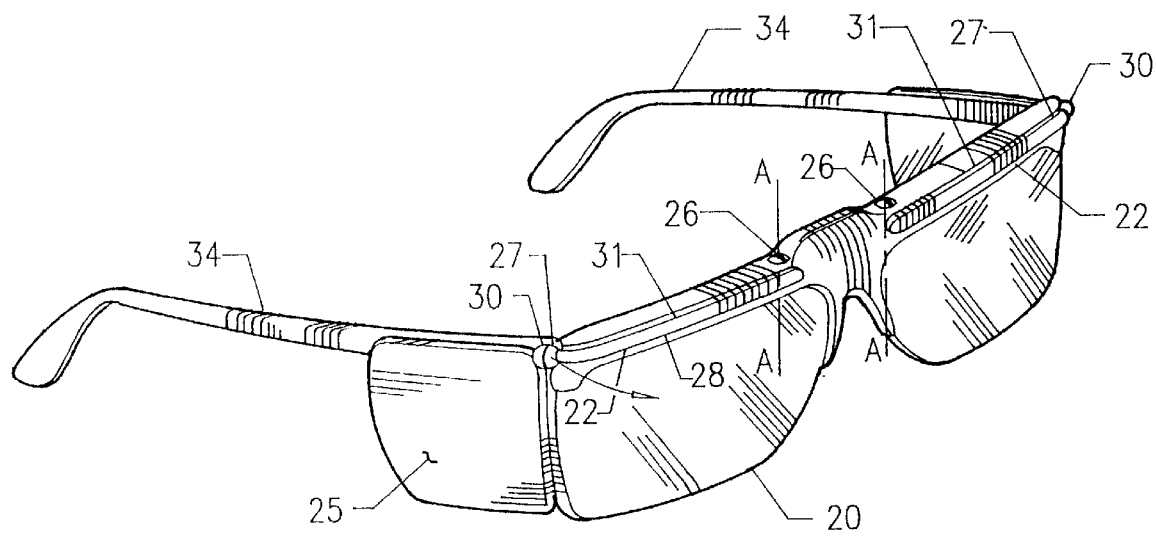
FIG. 1 is a perspective front view of a pair of eyeglasses forming a part of an optical system in a non-operative position for extending the normal field of vision.
Figure 2:
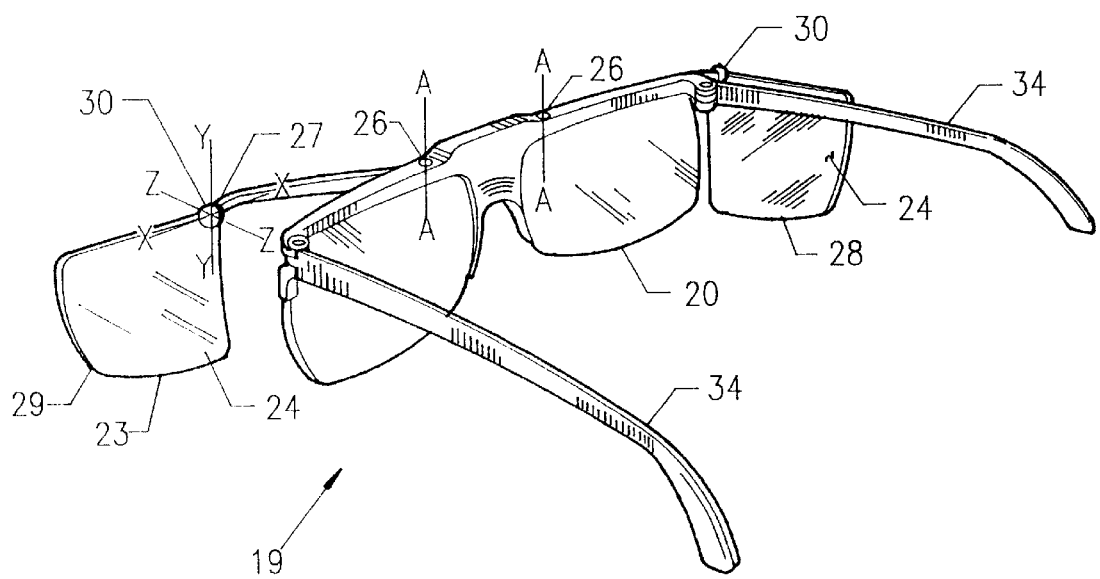
FIG. 2 is a perspective rear view of the optical system with a left side arm and reflector in operable positions.

Referring now to the drawings wherein like numerals designate like and corresponding parts throughout the several views, in FIGS. 1 and 2, inclusive, a pair of eyeglasses 20 is shown as part of my optical system 19 for extending the normal field of vision.

The optical system 19 is comprised of a frame 20, a pair of long elongated arms 22 attached to the front of the frame 20, and a pair of opaque reflectors 23 attached to outer end portions 27 of the arms 22. As used herein, the word "frame" consists of the eyeglasses 20 or any structure, such as an article of headware which provides a suitable means for attaching a pair of long slender arms 22 at about an eye level in front of a user. One surface of each of the reflectors 23 is mirrorized, plated or polished to reflect images outside of the normal field of vision into the view of a user. The opposite surface 25 of the reflector 23 may have any decorative or functional finish. By way of example of a functional finish, the opposite surface 25 may be a phosphorescent finish such that when the reflector is at right angles to the temples 34, the phosphorescent surface is presented foreward to protect hikers, joggers and bicyclists from collisions with oncoming vehicles.

With reference to FIGS. 1 and 2, the inner end portions 26 of the pair of arms 22 are attached for rotation to the front of the eyeglasses 20 and the arms 22 extend outwardly to the ends of the eyeglasses 20. The arms 22 are rotatable about vertical axes "A" in horizontal planes from non-operative positions 28 adjacent to the spectacles 20 to forward operable positions 29 where the generally rectangular reflectors 23 at the outer ends of the arms 22 are in forward relationship to the eyeglasses 20.

The overall appearance of the spectacles 20 in FIGS. 1 and 2, particularly when the arms 22 and reflectors 23 are in their non-operative positions 28, is conventional. The rectangular reflectors 23 are preferably joined to the outer end portions 27 of the arms 22 with spherical joints 30. The portions 31 of the eyeglasses 20 opposite the arms 22 are preferably recessed to enhance the appearance of the optical system 19 when the reflectors 23 are not in use.

One benefit of the recesses 31 is that the arms 22 are supported in the non-operative positions 28 and less likely to be damaged when the optical system 19 is not in use. The appearance of the optical system 19 is further enhanced by storing the reflectors 23 adjacent to the sides of the eyeglasses' temples 34 when the reflectors 23 are not in use. When the reflectors 23 are stored against the temples 34, they shield the eyes from air borne particles and sun glare.

When the arms 22 are in their operative positions 29, the reflectors 23 are forward and slightly outward from the eyes of a user and the mirrorized surfaces 24 of the reflectors 23 are visible to the user. The reflectors 23 are adjustable forwardly and rearwardly by rotating the arms 22 about the vertical axis "A-A" and are rotatable about the orthogonal "X—X", "Y—Y" and "Z—Z" axes. Thus, a user can selectively adjust the reflectors 23 through a wide range to enlarge either the lateral, vertical or rear portions of his extended field of vision.

Figure 3:
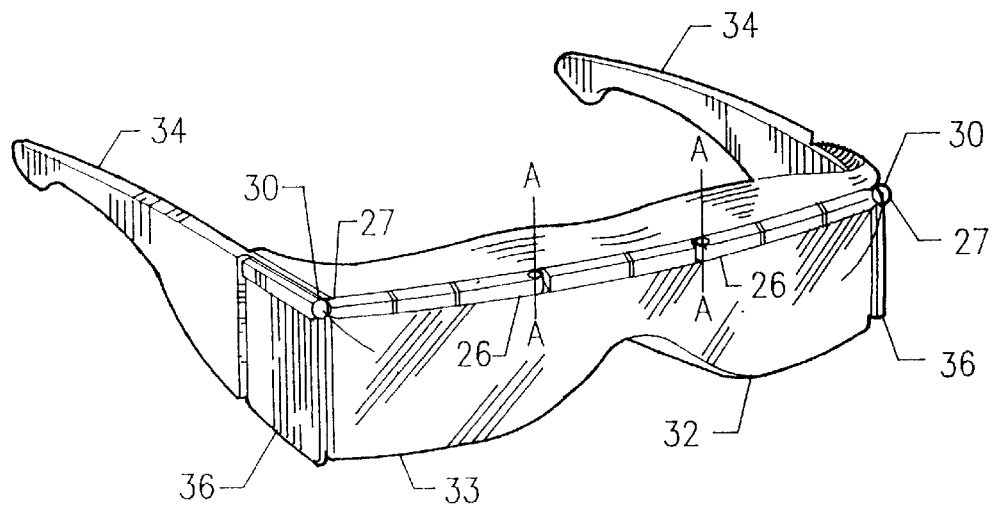
FIG. 3 is a perspective front view of a pair of,safety glasses forming a part of an optical system in a non-operative position for extending the normal field of vision.
Figure 4:
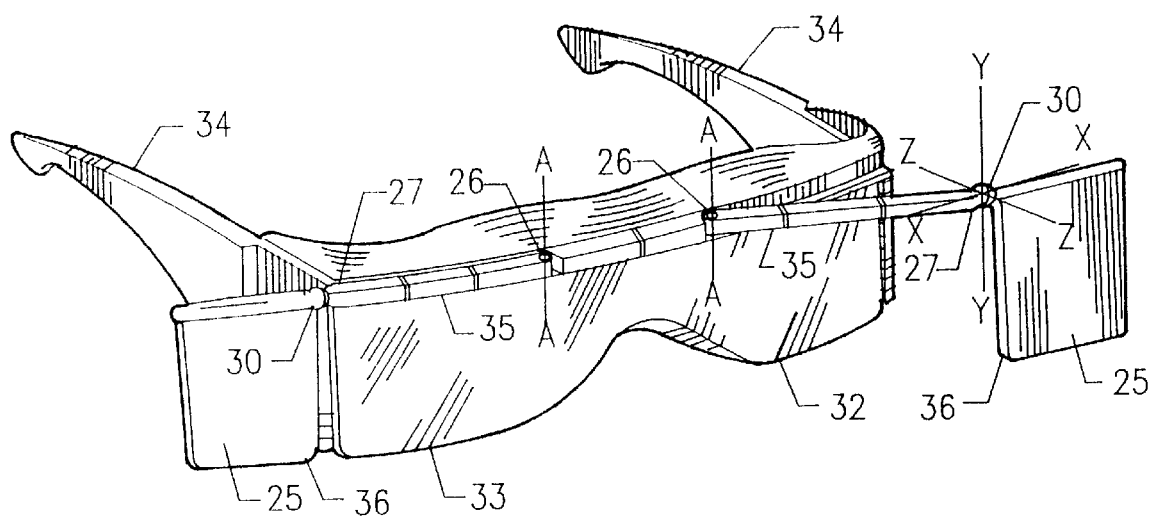
FIG. 4 is a perspective front view of the safety glasses with a left side arm and reflector in operable positions and a right side reflector in a rotated position.

Referring now to FIGS. 3 and 4, a pair of conventional styled safety glasses 32 is shown which embodies my invention. The safety glasses 32 which serve as a frame are comprised of a front shield 33 and a pair of temples 34 at the sides of the safety glasses 32 which are pivotally attached to outer end portions of the front shield 33. A pair of elongated slender arms 35 are pivotally attached to the front of the shield 33 rotatable in horizontal planes from non-operative, stored positions 28 adjacent to the shield 33 to operative positions 29 forward of the shield 33. A rectangular reflector 36 is joined to end portions 27 of each arm 35 by a spherical joint 30.

Figure 5:
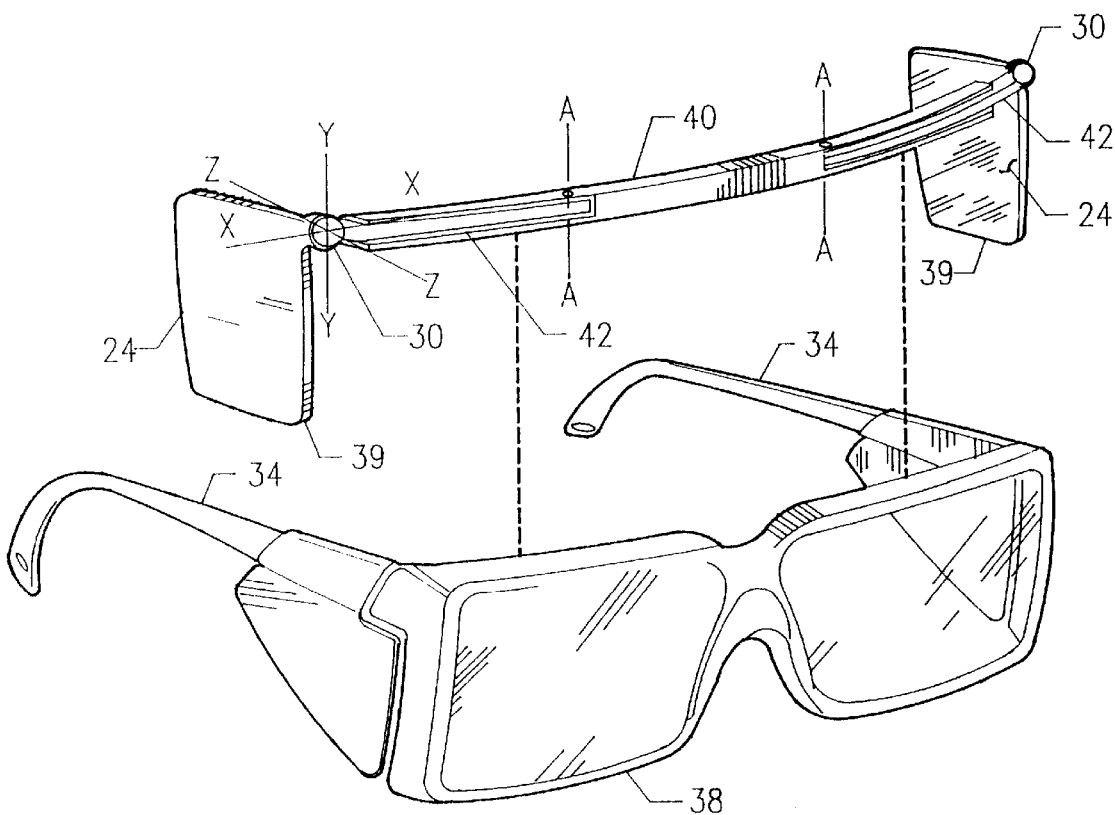
FIG. 5 is an exploded perspective front view of a conventional pair of safety glasses and an accessory optical system.
Figure 6:
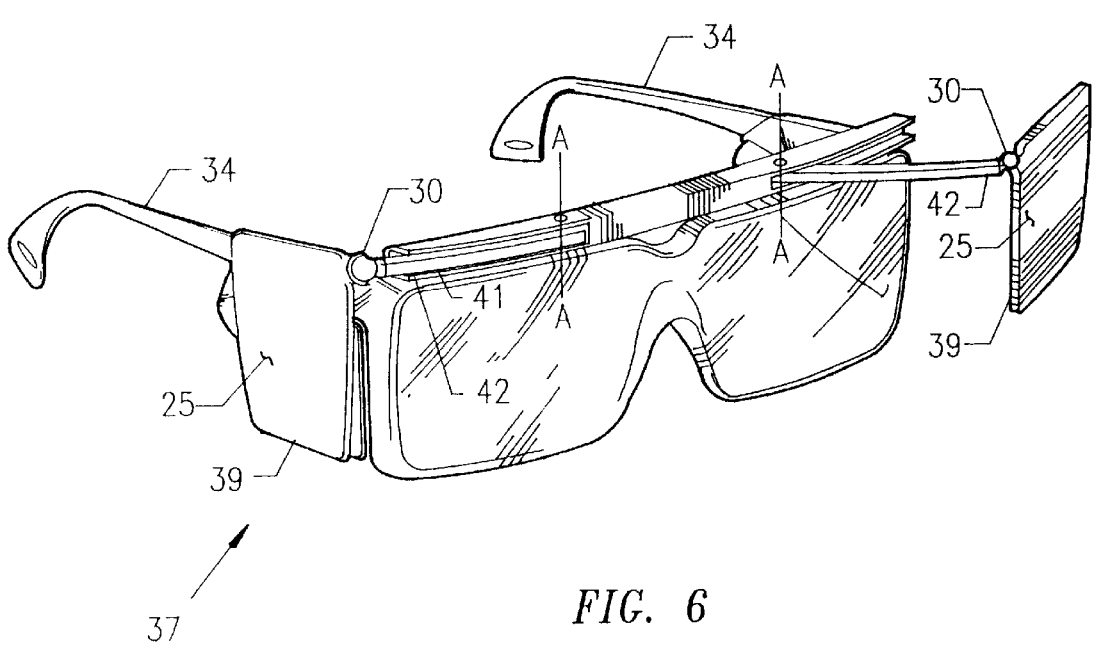
FIG. 6 is a perspective front view of the accessory optical system mounted on the safety glasses with left side arm and reflector in operable positions.

In FIGS. 5 and 6, my optical system 37 is available as an accessory. One advantage of this aspect of the invention is that the large numbers of existing safety glasses can be retrofitted with my invention. A pair of rectangular reflectors 39 are joined with spherical joints 30 to outer end portions of a pair of slender arms 42. The inner portions of the slender arms 42 are pivotally attached to a forward opening "C"

section elongated member 40 which serves as a frame. A lower horizontal portion 41 of the elongated member 40 is adhesively attached to the front of the safety glasses 38.

Figure 7:
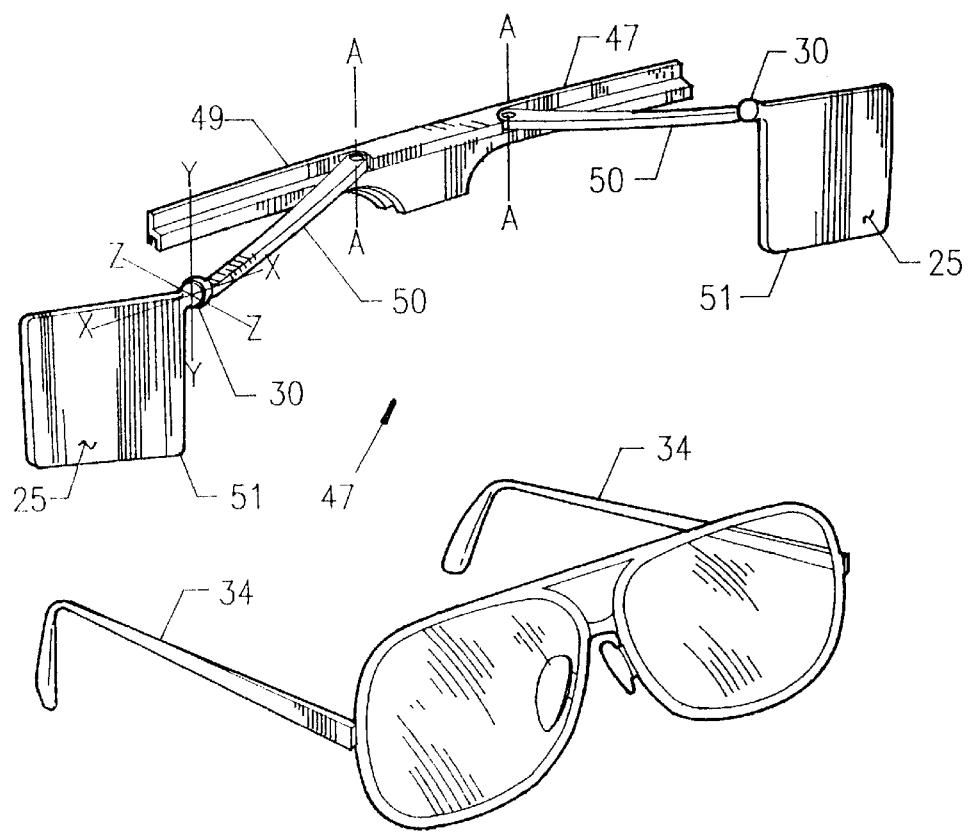
FIG. 7 is an exploded perspective front view of a conventional pair of eyeglasses and an accessory optical system with right and left side arms and reflectors of the optical system in operative positions.

In FIG. 7, a pair of conventional eyeglasses 48 is shown with the optical system 47 as an accessory. The optical system 47 is comprised of a downward opening channel member 49, a pair of slender arms 50 and a pair of reflectors 51 joined with spherical joints 30 to outer end portions of the slender arms 50. The inner end portions of the slender arms 50 are attached for rotation to the channel member 49. The optical system 47 is attached to the eyeglasses 48 by engaging the downward opening channel member 49 with an upper portion of the eyeglasses 48.

Figure 8:
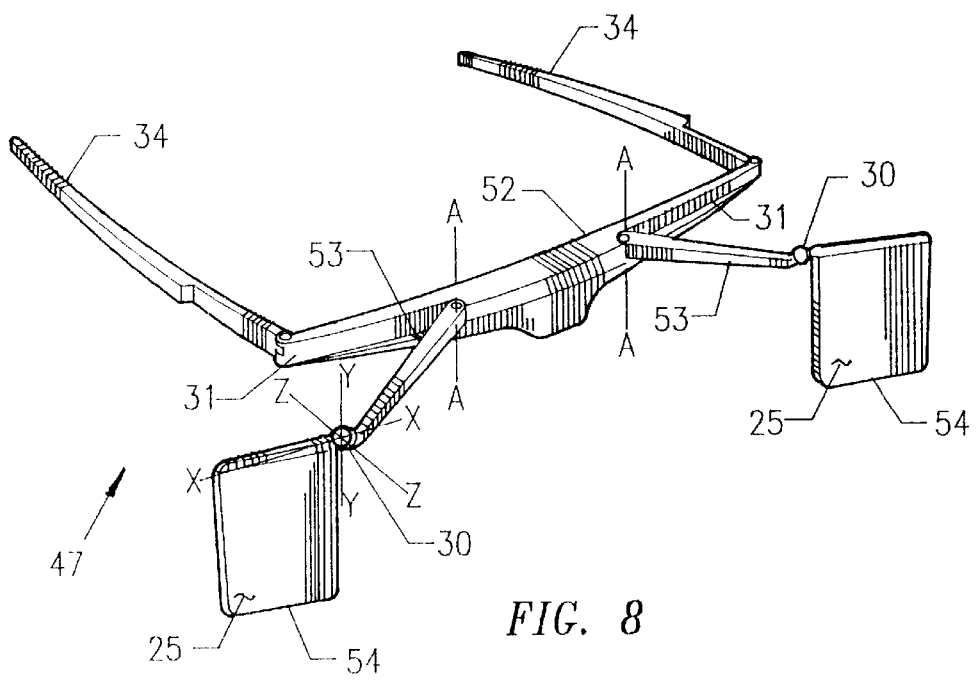
FIG. 8 is a perspective front view of a headband with a pair of reflectors in operative positions for extending the normal field of vision.

In FIG. 8, inner end portions of a pair of slender elongated arms 53 are pivotally attached to a front portion of a headband 52. A pair of rectangular reflectors 54 are joined with spherical joints 30 to outer end portions of the slender arms 53.

Figure 9:
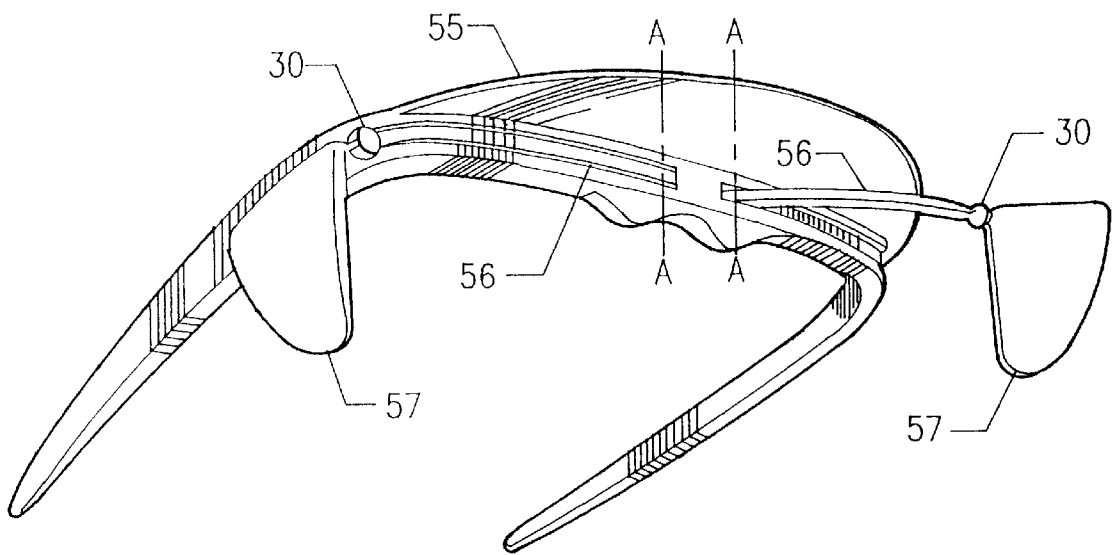
FIG. 9 is a perspective front view of a sunshade with a left side arm and reflector in operable positions.
Figure 10:
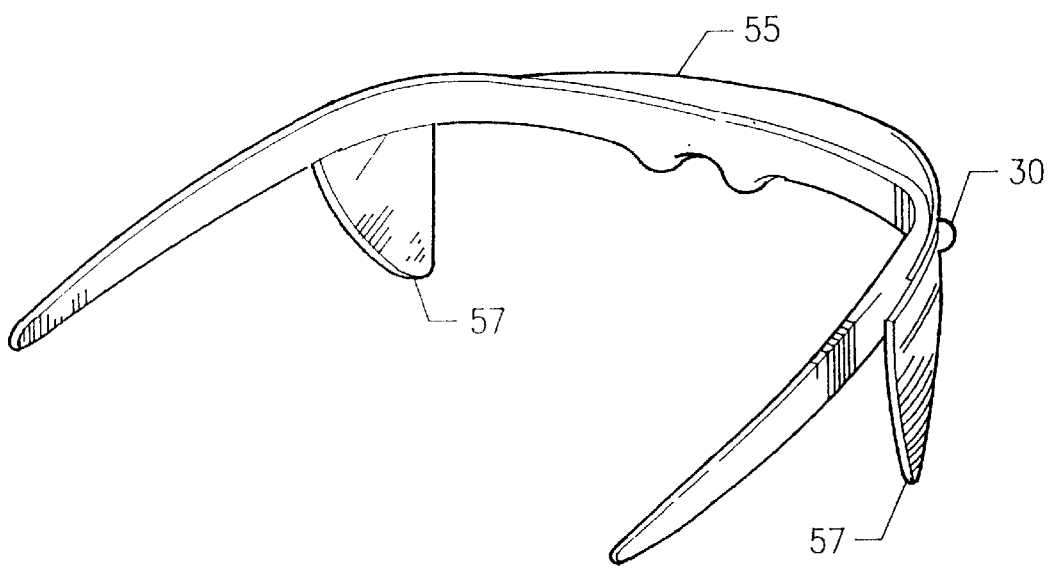
FIG. 10 is a perspective rear view of the sunshade with the left side arm and reflector and a right side arm and reflector in non-operative positions.

In FIGS. 9 and 10, inner end portions of a pair of slender arms 56 are pivotally joined to a front portion of a sun shade 55 which is adapted to be worn on a head of a user. A pair of reflectors 57 are joined with spherical joints 30 to outer end portions of the elongated arms 56. A recess 31 is provided in the front of the sunshade 55 for storing the arms 56 when the optical system is not in use.

Figure 11:
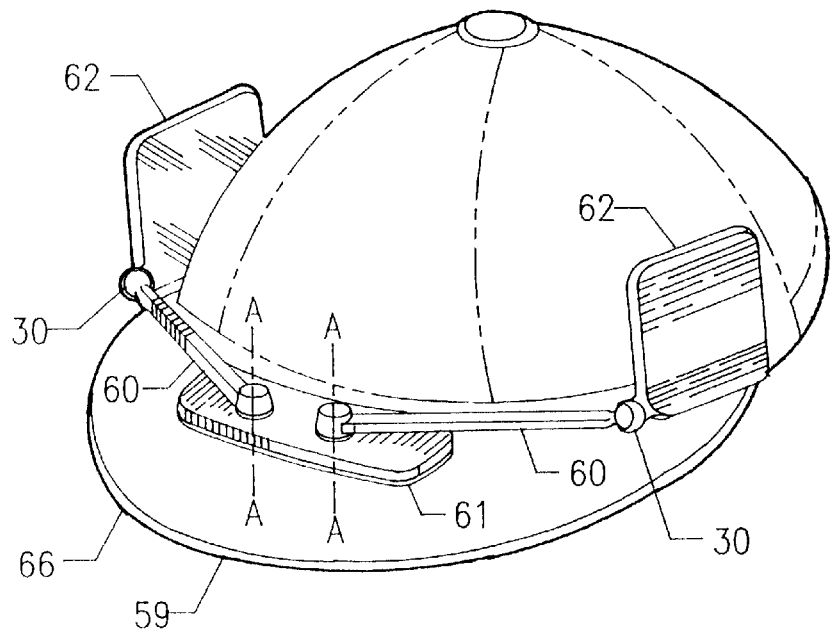
FIG. 11 is a perspective front view of a baseball cap with a pair of arms and reflectors in non-operative positions.
Figure 12:
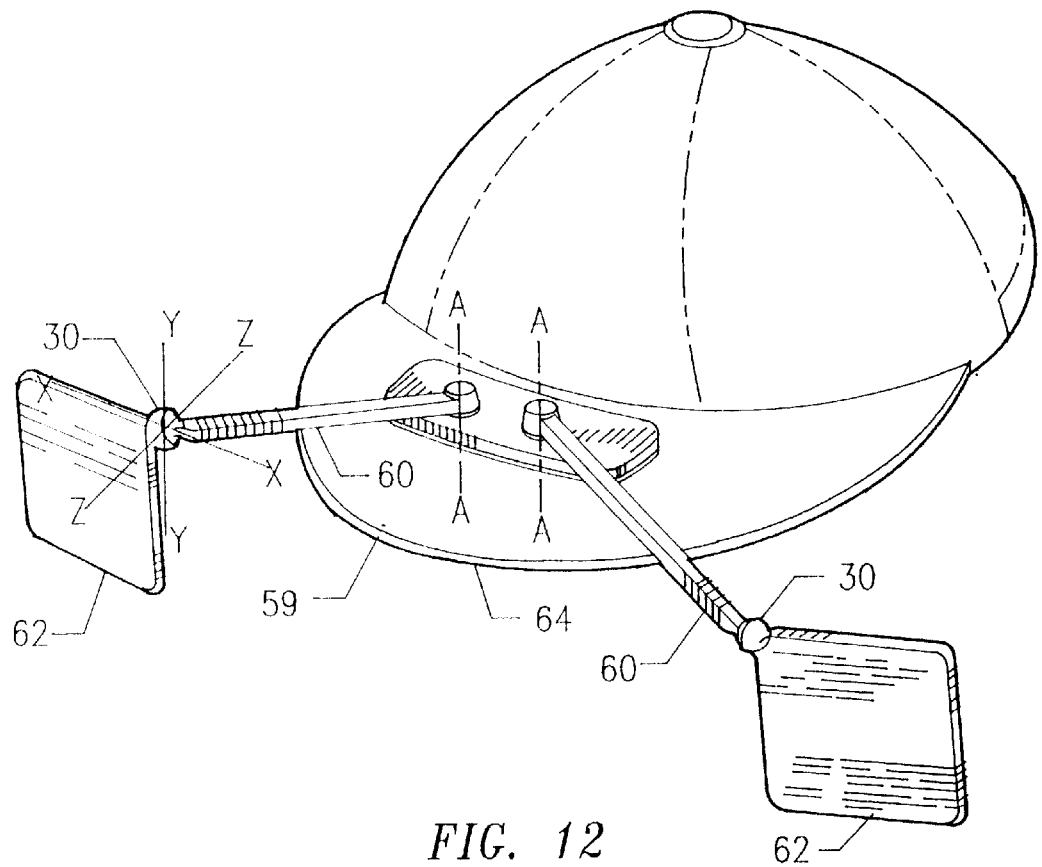
FIG. 12 is a perspective front view of the cap with the optical elements in operable positions.

In FIGS. 11 and 12, a pair of slender arms 60 are attached for rotation at inner end portions thereof to member 61 which is mounted on a visor 66 of a baseball cap 59. A pair of generally rectangular reflectors 62 are joined with spherical joints 30 to outer end portions of the elongated arms 60.

Figure 13:
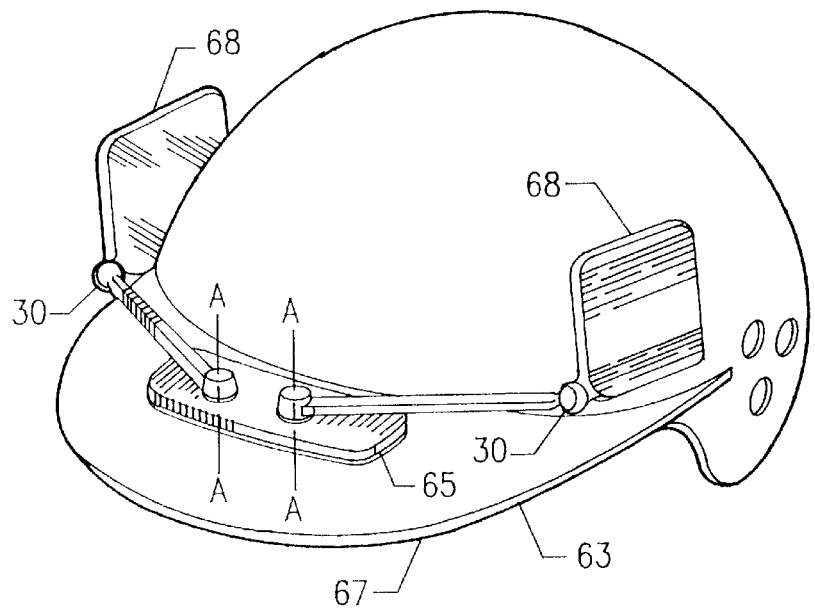
FIG. 13 is a perspective front view of a helmet with a pair of arms and reflectors in non-operative positions.
Figure 14:
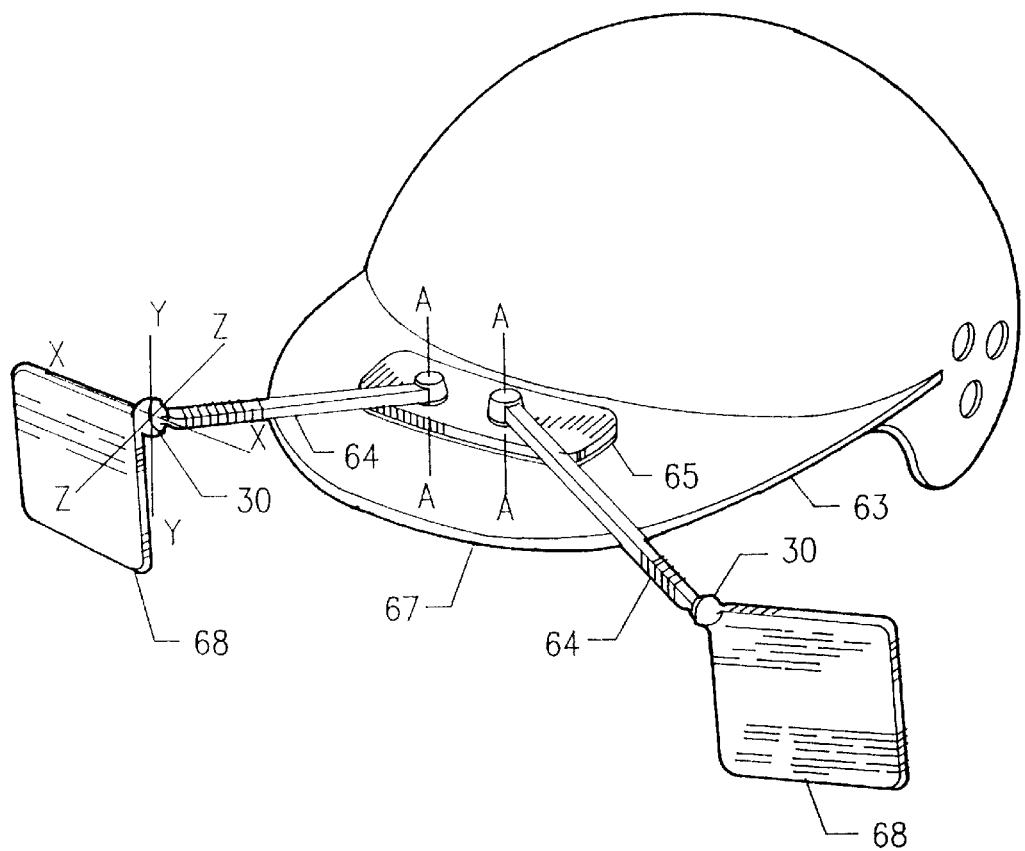
FIG. 14 is a perspective front view of the helmet with the optical elements in operable positions.

In FIGS. 13 and 14, a pair of slender arms 64 are pivotally attached at inner end portions thereof to a member 65 which is mounted on a visor 67 of a helmet 63. A pair of generally rectangular reflectors 68 are joined with spherical joints 30 to outer end portions of the elongated arms 67. It will be apparent from FIGS. 11–14, that the arms 60 and 67 can also be directly attached to the articles of headwear 59 and 63 without the members 61 and 65.

From the foregoing it will be appreciated that my invention is an optical system for extending the normal field of vision which provides effective and adaptable to many forms of conventional headwear without significantly altering their appearance. It will be further appreciated that my invention can reduce injuries and crime as well as contributing to the enjoyment of a user.

Although only several embodiments have been illustrated and described, it is not my intention to limit my invention to these embodiments, since other embodiments can be developed by such changes as material, shape and arrangement of parts, and substitution of elements without departing from the spirit thereof.

I claim:

1. An article of headwear for extending the normal field of vision comprising, a front portion for mounting an inner end portion of a slender elongated arm in a center portion of said front portion for rotation about a vertical axis at about eye level in front of a user; at least one slender horizontal arm pivotally attached to said center portion of said front portion for rotation about said vertical axis, said arm having an inner end portion for attaching said arm to said center portion of said front portion and an outer end portion for joining said arm to a reflector, said arm having a non-operative position in adjacent relationship to said front portion of said headwear and an operative position in forward angular relationship to said front portion of said headwear; and a reflector pivotally attached to said outer end portion of said arm, said reflector having an operative position forward of said headwear and a non-operative position adjacent to a side of said headwear.

2. The headwear recited in claim 1 further comprising a second slender horizontal arm pivotally attached to said center portion of said front portion of said headwear, said arm having an inner end portion for attaching said arm to said center portion of said front portion of said headwear and an outer end portion for attaching a second reflector to said second arm, said second arm having a non-operative position in adjacent relationship to said front portion of said headwear and an operative position in forward angular relationship to said front portion of said headwear; and a second generally rectangular reflector pivotally attached to said outer end portion of said arm, said second reflector having an operative position forward of said headwear and a non-operative position adjacent to an opposite side of said headwear. having an inner end portion for attaching said arm to a center portion of said front portion of said headwear and an outer end portion for attaching a second reflector to said second arm, said second arm having a non-operative position in adjacent relationship to said front portion of said headgear and an operative position in forward angular relationship to said front portion of said headwear; and a second generally rectangular reflector pivotally attached to said outer end portion of said arm, said second reflector having an operative position forward of said headwear and a non-operative position adjacent to an opposite side of said headwear.

3. The headwear recited in claim 2 wherein said inner portions of said arms are in end-to-end relationship on said front portion of said headwear.

4. The headwear recited in claim 1 wherein said reflector is a generally rectangular shaped reflector.

5. The headwear recited in claim 1 wherein said reflector has a mirrorized surface for extending a normal field of vision and an opposite phosphorescent surface for protecting a user.

6. The headwear recited in claim 1 further comprising a spherical joint for joining said reflector to said arm.

7. In an article of headwear of the class having a front portion for mounting a slender elongated arm, the improvement comprising: at least one reflector for extending the normal field of vision of a user of said headwear; at least one slender elongated arm having an inner end portion pivotally attached to a center portion of said front portion of said article of headwear for mounting said reflector on said headwear, said arm being rotatable at said inner arm portion about a vertical axis to selectively position said reflector at a forward operative position relative to said headwear, said arm having an outer end portion for joining said reflector to said arm; and a means for joining said reflector to said outer end portion of said slender elongated arm to selectively rotate said reflector at least one axis.

8. The improvement recited in claim 7 wherein said reflector is a generally rectangular shaped reflector.

9. The improvement recited in claim 7 wherein said means for joining said reflector to said outer end portion of said arm is a spherical joint.

10. The improvement as recited in claim 7 wherein said inner portion of said arm is pivotally attached to a center portion of said front portion of said article of headwear.

11. The improvement as recited in claim 7 wherein said article of headwear is a baseball cap.

12. The improvement as recited in claim 7 wherein said article of headwear is a sunshade.

13. The improvement as recited in claim 7 wherein said article of headwear is a helmet.

14. In an article of headwear of the class having a front portion for mounting a pair of slender elongated arms, the improvement comprising: an optical system mounted on said article of headwear for extending the normal field of vision of a user of said headwear, said optical system comprising: a pair of slender elongated arms, each of said arms having an inner end portion pivotally attached to a center portion of said front portion of said article of headwear, said arms being rotatable about said inner end portions to selectively position a pair of reflectors at forward operative positions relative to said front portion of said headwear; a reflector attached to an outer end portion of each of said arms for viewing objects outside said user's normal field of vision; and a spherical joint for joining each of said reflectors to said outer end portion of each of said slender elongated arms and selectively rotating each of said reflectors.

15. A method for extending the normal field of vision of a person wearing an article of headwear comprising the steps of: forwardly rotating at least one slender elongated arm about an axis passing through to a central front portion of said article of headwear in a horizontal plane from a non-operative rearward position adjacent to said front portion of said article of headwear to a forward operative position; and rotating a reflector about an axis passing through an outer end portion of said slender elongated arm to laterally or rearwardly extend person's normal field of vision.

16. The method recited in claim 15 further comprising the step of rotating said reflector about a second axis passing through said end portion of said arm at said forward operative position to vertically extend said user's normal field of vision.

17. The method recited in claim 15 further comprising the steps of forwardly rotating a second slender elongated arm about an axis passing through said central front portion of said article of headwear from a non-operative rearward position adjacent to said article of headwear to a forward operative position; and rotating a second reflector about an axis passing through an outer end portion of said second arm to further extend said person's normal field of vision.

18. The method recited in claim 15 further comprising the step of rearwardly rotating said slender arm about said axis passing through to said front portion of said article of headwear from said operative position to said non-operative position adjacent to said article of headwear.

* * * * *

UNITED STATES PATENT AND TRADEMARK OFFICE
CERTIFICATE OF CORRECTION

PATENT NO. : 5,929,965
DATED : July 27, 1999
INVENTOR(S) : Joseph J. Berke

It is certified that error appears in the above-indentified patent and that said Letters Patent is hereby corrected as shown below:

Column 5, line 18, after "headwear." --delete the remainder of claim 2.--

Signed and Sealed this

Thirtieth Day of November, 1999

Attest:

Q. TODD DICKINSON

Attesting Officer

Acting Commissioner of Patents and Trademarks